United States Patent
Namiki

(10) Patent No.: US 11,524,433 B2
(45) Date of Patent: Dec. 13, 2022

(54) INJECTION MOLDING MACHINE

(71) Applicant: FANUC CORPORATION, Yamanashi (JP)

(72) Inventor: Kensuke Namiki, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 541 days.

(21) Appl. No.: 15/713,944

(22) Filed: Sep. 25, 2017

(65) Prior Publication Data

US 2018/0085981 A1 Mar. 29, 2018

(30) Foreign Application Priority Data

Sep. 27, 2016 (JP) .............................. JP2016-188085

(51) Int. Cl.
 *B29C 45/02* (2006.01)
 *B29C 45/20* (2006.01)
 (Continued)

(52) U.S. Cl.
 CPC .............. *B29C 45/20* (2013.01); *B29C 45/18* (2013.01); *B29C 45/53* (2013.01); *B29C 45/586* (2013.01); *B29C 45/76* (2013.01); *B29C 2045/575* (2013.01); *B29C 2945/762* (2013.01); *B29C 2945/76006* (2013.01); (Continued)

(58) Field of Classification Search
 CPC ....... B29C 45/02; B29C 45/021; B29C 45/20; B29C 45/53; B29C 45/531; B29C 2045/536
 See application file for complete search history.

(56) References Cited

U.S. PATENT DOCUMENTS 3,145,244 A * 8/1964 Morin ..................... B29C 45/07
 264/328.11
4,557,683 A 12/1985 Meeker et al.
 (Continued)

FOREIGN PATENT DOCUMENTS

CN 104512018 A 4/2015
DE 1529962 B * 2/1972 ............. B29C 45/20
 (Continued)

OTHER PUBLICATIONS

English Machine Translation for Japanese Publication No. 50-027859 B1, published Sep. 10, 1975, 6 pages.
(Continued)

*Primary Examiner* — Jacob T Minskey
(74) *Attorney, Agent, or Firm* — Fredrikson & Byron, P.A.

(57) ABSTRACT

An injection molding machine includes: a plunger provided inside a barrel and capable of moving forward and backward in an axial direction thereof and rotating about an axis thereof; a feed hole for feeding a molding material in liquid form into a front of the plunger; a packing provided on a backward side of the feed hole to prevent the molding material fed through the feed hole from flowing backward along the plunger; and a controller for controlling a retracting movement of the plunger based on pressure of the molding material fed from the feed hole to thereby perform metering. In this configuration, at least part of the feed hole is covered by a side surface of the plunger at least from start to end of the retracting movement.

6 Claims, 7 Drawing Sheets

(51) Int. Cl.
   *B29C 45/18* (2006.01)
   *B29C 45/53* (2006.01)
   *B29C 45/58* (2006.01)
   *B29C 45/76* (2006.01)
   *B29C 45/57* (2006.01)

(52) U.S. Cl.
   CPC ............ *B29C 2945/76367* (2013.01); *B29C 2945/76568* (2013.01); *B29C 2945/76678* (2013.01); *B29C 2945/76846* (2013.01)

(56) References Cited

U.S. PATENT DOCUMENTS

| | | | | |
|---|---|---|---|---|
| 6,086,353 | A * | 7/2000 | Klaus | ............... B29C 45/53 425/145 |
| 9,259,871 | B2 * | 2/2016 | Shiraishi | ............... B29C 45/461 |
| 2015/0125563 | A1 * | 5/2015 | Shiraishi | ............... B29C 45/461 425/149 |

FOREIGN PATENT DOCUMENTS

| | | | |
|---|---|---|---|
| DE | 102007042808 | B3 | 4/2009 |
| JP | 50-027859 | B1 | 9/1975 |
| JP | 880549 | A | 3/1996 |
| JP | 10-337754 | A | 12/1998 |
| JP | 2006334974 | A | 12/2006 |
| JP | 201585667 | A | 5/2015 |

OTHER PUBLICATIONS

English Abstract and Machine Translation for Japanese Publication No. 10-337754 A, published Dec. 22, 1998, 9 pages.

English Abstract for Japanese Publication No. 2015-085667 A, published May 7, 2015, 2 pgs.

English Abstract and Machine Translation for Japanese Publication No. 2006-334974 A, published Dec. 14, 2006, 13 pgs.

English Abstract and Machine Translation for Japanese Publication No. 08-080549 A, published Mar. 26, 1996, 10 pgs.

English Abstract and Machine Translation for German Publication No. DE102007042808B3, published Apr. 2, 2009, 9 pgs.

English Abstract and Machine Translation for Chinese Publication No. CN104512018A, published Apr. 15, 2015, 20 pgs.

* cited by examiner

INJECTION MOLDING MACHINE

CROSS-REFERENCE TO RELATED APPLICATION

This application is based upon and claims the benefit of priority from Japanese Patent Application No. 2016-188085 filed on Sep. 27, 2016, the contents of which are incorporated herein by reference.

BACKGROUND OF THE INVENTION

Field of the Invention

The present invention relates to an injection molding machine with a plunger.

Description of the Related Art

Japanese Laid-Open Patent Publication No. 2015-085667 discloses an injection molding machine in which a liquid molding material is injected from the front side of a plunger. This configuration makes it possible to perform metering of a molding material without unnecessarily shearing or kneading the molding material in a case of the molding material which does not require or hardly requires a plasticizing step and a kneading step.

SUMMARY OF THE INVENTION

However, in Japanese Laid-Open Patent Publication No. 2015-085667, since a liquid molding material is fed from the front of the plunger, the molding material flows into the gap between the plunger and the nozzle adapter (or the nozzle). For this reason, the molding weight varies, resulting in molding defects. Besides, the molding material flowing into the gap stagnates therein and deteriorates, so that the frictional force between the plunger and the nozzle adapter (or the nozzle) increases, and consequently the life-time of the plunger is shortened.

It is therefore an object of the present invention to provide an injection molding machine which can suppress occurrence of molding defects and improve the life-time of the plunger in the case that the molding material is in a liquid state.

According to an aspect of the present invention, there is provided an injection molding machine that performs molding by injecting a molding material into a mold from a nozzle arranged on a distal end side of a barrel, including: a plunger provided inside the barrel and configured to move forward and backward in an axial direction thereof and rotate about an axis thereof; a feed hole configured to allow the molding material in liquid form to be fed into a front of the plunger; a backflow prevention member provided on a backward side of the feed hole and configured to prevent the molding material fed through the feed hole from flowing backward along the plunger; and a controller configured to control retracting movement of the plunger based on the pressure of the molding material fed from the feed hole to thereby perform metering, wherein at least part of the feed hole is covered by the side surface of the plunger at least from the start to the end of the retracting movement.

With this configuration, since the molding material is fed from the side surface of the plunger, it is possible to reduce the amount of molding material stagnating around the side surface of plunger. As a result, occurrence of molding failures can be suppressed. It is also possible to reduce the frictional force acting on the plunger, and hence improve the life-time of the plunger.

In the injection molding machine according to the aspect of the present invention, the nozzle may be attached directly to the barrel; the nozzle and the barrel each may have a bore formed thereinside that enables the plunger to move forward and backward; the feed hole may be formed in the nozzle so as to allow the molding material to be fed into the bore formed inside the nozzle; and the backflow prevention member may be attached to the bore formed inside the nozzle or the barrel.

With this configuration, it is possible to reduce the amount of molding material stagnating around the side surface of plunger, and reduce the frictional force acting on the plunger. Accordingly, it is possible to improve the life-time of the plunger. Also, occurrence of molding failures can be suppressed.

In the injection molding machine according to the aspect of the present invention, the nozzle may be attached to the barrel via a nozzle adaptor; the nozzle adaptor and the barrel each may have a bore formed thereinside that enables the plunger to move forward and backward; the feed hole may be formed in the nozzle adaptor so as to allow the molding material to be fed into the bore formed inside the nozzle adaptor; and the backflow prevention member may be attached to the bore formed inside the nozzle adaptor or the barrel.

With this configuration, it is possible to reduce the amount of molding material stagnating around the side surface of plunger, and reduce the frictional force acting on the plunger. Accordingly, it is possible to improve the life-time of the plunger. Also, occurrence of molding failures can be suppressed.

In the injection molding machine according to the aspect of the present invention, at least part of a distal end portion of the plunger may have an outer diameter greater than that of a portion of the plunger other than the distal end portion while a gap between the at least part of the distal end portion and the bore is set to be equal to or smaller than a predetermined size; and at least part of the feed hole is covered by the side surface of the distal end portion of the plunger at least from the start to the end of the retracting movement.

With this configuration, it is possible to inhibit the molding material from flowing backward or in the retracting direction of the plunger when the plunger injects the molding material into the cavity of the mold or holds the pressure. In addition, since the backward flow can be suppressed, it is possible to simplify the check valve provided in the feed hole, and thereby save costs. In addition, it is possible to suppress backflow of the molding material, and hence pressure can be efficiently applied on the molding material in front of the plunger. Furthermore, it is possible to suppress the friction acting on the plunger when the plunger moves forward and rearward.

In the injection molding machine according to the aspect of the present invention, a flight may be provided on the distal end side of the plunger. This configuration enables the molding material fed from the side face of the plunger to be fed into the space in front of the plunger in a favorable manner.

In the injection molding machine according to the aspect of the present invention, a mixing portion configured to shear or knead the molding material may be provided on a distal end side of the plunger. In the structure, the molding material fed from the side surface of the plunger can be sheared and kneaded.

In the injection molding machine according to the aspect of the present invention, a second hole communicating with the bore of the barrel may be formed in a proximal end portion of the barrel. With this, even if gas is generated from the molding material or when air is entrapped in the molding material, it is possible to remove the air and gases through the second hole, and thereby prevent occurrence of molding defects such as silver streaks, bubble defects and the like. Even when the molding material flows backward and leak to the proximal end portion side of the plunger, the molding material having leaked into the bore on the proximal end portion side can be removed easily through this second hole.

In the injection molding machine according to the aspect of the present invention, the controller may be configured to rotate the plunger during the retracting movement. In the structure, it is possible to prevent the plunger from being locally worn, and hence improve the life-time of the plunger.

According to the present invention, since the molding material is fed from the side surface of the plunger, it is possible to reduce the amount of the molding material staying around the side surface of the plunger. As a result, occurrence of molding failures can be reduced. In addition, the frictional force acting on the plunger can be suppressed, and hence the life-time of the plunger can be improved.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of an injection molding machine according to the present invention will be described with reference to the accompanying drawings.

An injection molding machine includes a machine bed, and a mold clamping device and an injection device which are mounted on the machine bed. The mold clamping device and the injection device are disposed to face each other. The mold clamping device includes a mold that can be opened and closed, and other components. The injection device includes a barrel, a nozzle and the like. The injection molding machine executes, under the control of a controller, a molding cycle of injecting a molding material from the nozzle disposed on a distal end side of the barrel into the mold to perform molding. The molding cycle includes a metering step, an injection step, a pressure holding step, and the like. In the present embodiment, since the injection molding machine is featured by the injection device, the injection device will be described in detail while description of the other components is omitted.

Figure 1:
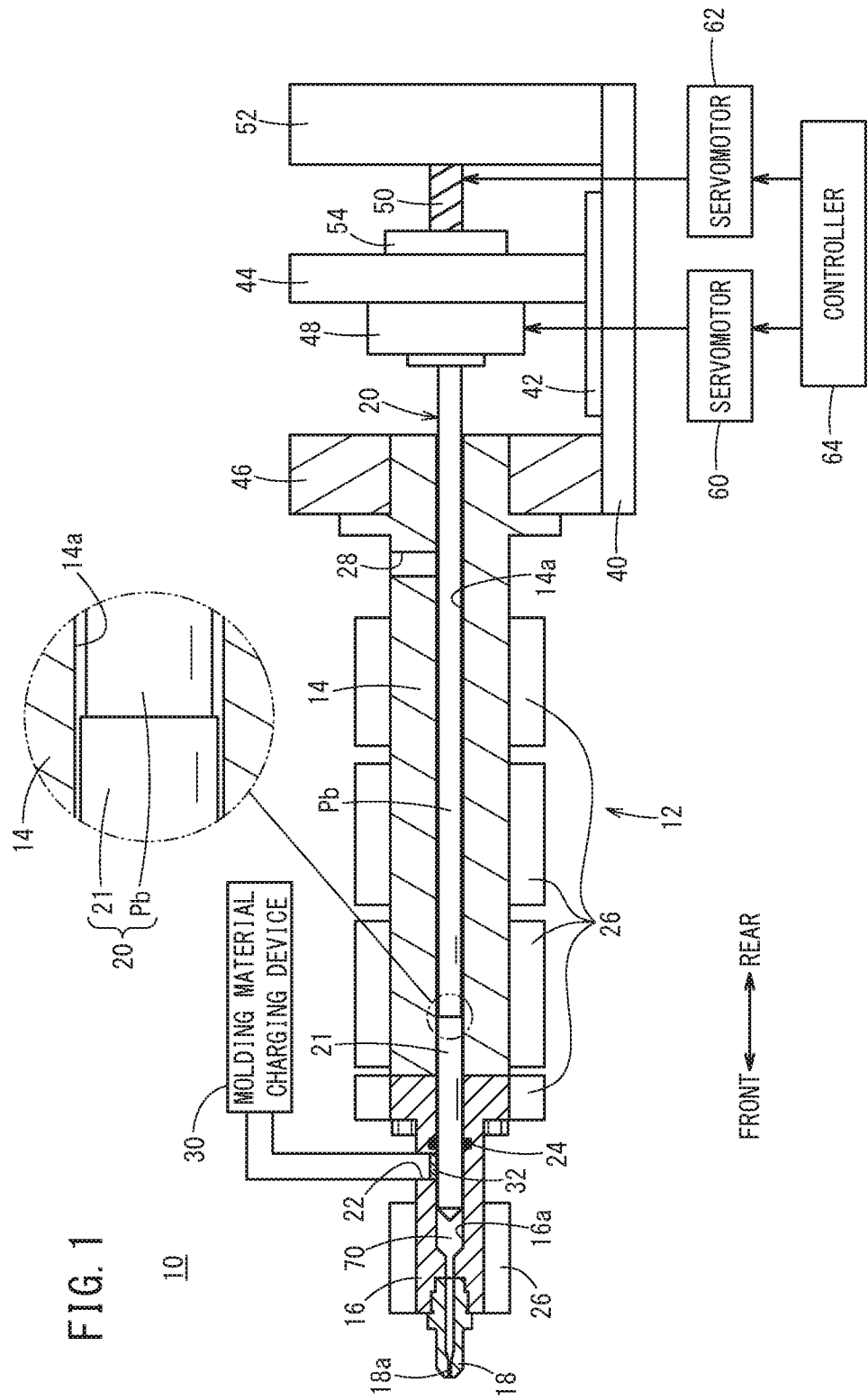
FIG. 1 is a diagram showing a configuration of an injection molding machine according to an embodiment.
Figure 2:
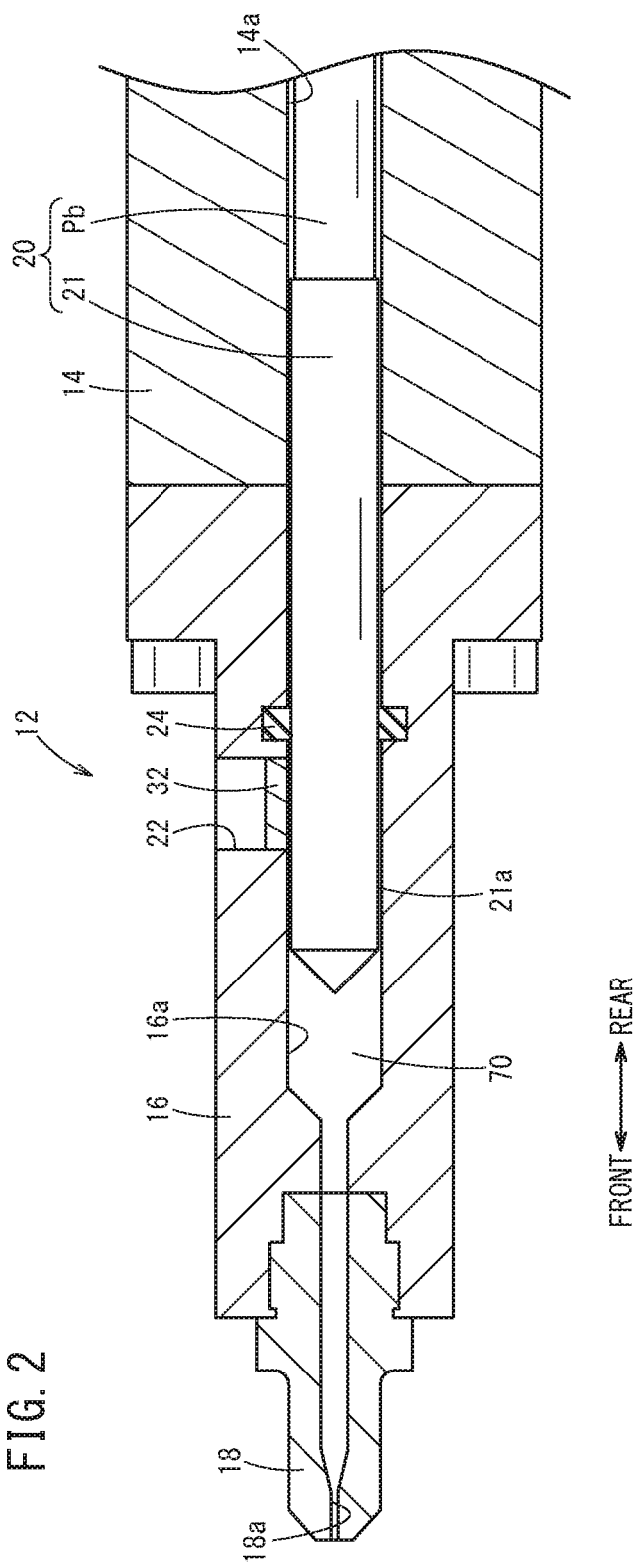
FIG. 2 is an enlarged view of main parts of an injection device shown in FIG. 1.

FIG. 1 is a diagram showing a configuration of an injection molding machine 10, and FIG. 2 is an enlarged view of main parts of an injection device 12 shown in FIG. 1. FIG. 1 mainly shows the configuration of the injection device 12, and the illustration of a machine bed and a mold clamping device is omitted.

The injection device 12 includes a barrel 14, a nozzle 18 attached to the distal end side of the barrel 14 via a nozzle adapter 16, and a plunger 20 provided inside the barrel 14 and the nozzle adapter 16 so as to be able to move forward and backward and rotate about the front-to-rear directional axis. The barrel 14 is formed with a bore 14a that enables movement of the plunger 20 in the front-rear direction. In addition, the nozzle adapter 16 is also formed with a bore 16a that enables movement of the plunger 20 in the front-rear direction. A nozzle hole 18a is formed in the nozzle 18 so as to inject molding material into the mold in the mold clamping device. This nozzle hole 18a communicates with the bore 16a of the nozzle adapter 16. The bore 16a of the nozzle adapter 16 and the bore 14a of the barrel 14 communicate with each other. It is preferable that the bores 14a and 16a have the same diameter. The direction in which the plunger 20 moves to the mold side or in a direction toward the nozzle 18 is defined as the forward direction, and the direction in which the plunger 20 moves to the other side or in a direction away from the nozzle 18 is defined as the backward or rearward direction.

The distal end portion (outermost diameter cylindrical portion) 21 of the plunger 20 is formed such that its outer diameter is greater than that of the other portion of the plunger 20 (hereinafter referred to as a proximal end portion) Pb than the distal end portion 21. That is, the plunger 20 has a configuration in which two cylindrical portions having different outer diameters are joined together, and the outer diameter of the cylindrical portion of the distal end portion 21 is greater than that of the cylindrical portion of the proximal end portion Pb. It should be noted that the tip of the distal end portion 21 has a conical shape whose cross-section becomes smaller as it goes forward.

The outer diameter of the distal end portion 21 is smaller than the diameter of the bore 16a of the nozzle adapter 16 by a predetermined amount (for example, 1 mm) or less. This makes it possible to suppress the gap (clearance in the direction orthogonal to the axial direction of the plunger 20) between a side surface 21a of the distal end portion 21 and the bore 16a to a predetermined amount or less.

Since the distal end portion 21 is formed with such a larger outer diameter, it is possible to prevent a molding material in front of the plunger 20 from flowing backward in the backward direction (in the retracting direction) of the plunger 20 when the plunger 20 injects or presses the molding material into the cavity of the mold. In other words, back flow of the molding material can be suppressed. Further, since the outer diameter of the proximal end portion Pb is smaller than that of the distal end portion 21, it is possible to suppress the friction occurring in the plunger 20 when the plunger 20 is moved forward or backward.

The nozzle adapter 16 is formed with a feed hole 22 for feeding a liquid molding material from the outside into the bore 16a of the nozzle adapter 16. The feed hole 22 is used to feed the molding material into the front of the plunger 20. An annular packing (backflow prevention member) 24 for preventing backflow of the molding material is attached to the bore 16a of the nozzle adapter 16 posterior to the feed hole 22. This packing 24 can prevent the molding material fed through the feed hole 22 from flowing backwardly of the plunger 20 through a gap (clearance) between the bore 16a of the nozzle adapter 16 and the side surface 21a of the distal end portion 21 of the plunger 20. The feed hole 22 and the packing 24 are preferably arranged at positions close to each other in the front-rear direction.

On the outer peripheral surface of the barrel 14 and the nozzle adapter 16, a temperature control device 26 for adjusting the temperature of the molding material in the nozzle adapter 16 and the barrel 14 is provided.

The barrel 14 has, on a proximal end side thereof, a second hole 28 communicating with the bore 14a. Owing thereto, even if gas is generated from the molding material or when air is entrapped in the molding material, it is possible to remove the air and gases through the second hole 28, whereby it is possible to prevent occurrence of molding defects such as silver streaks, bubble defects and the like. Even when the molding material flows backward, passing through the packing 24 to leak to the proximal end portion Pb side of the plunger 20, the molding material having leaked into the bore 14a on the proximal end portion Pb side can be removed easily through this second hole 28. When a solid molding material is used for molding, this second hole 28 can also be used as a charging port for supplying the solid molding material.

A molding material charging device 30 of the injection molding machine 10 generates a charging pressure by use of driving force caused by pneumatic pressure, hydraulic pressure, an electric motor or the like, to thereby feed the molding material into the front of the plunger 20 from the feed hole 22. In order to prevent the molding material fed through the feed hole 22 into the bore 16a from flowing backward from the feed hole 22 to the outside (molding material charging device 30), the nozzle adapter 16 (feed hole 22) is preferably provided with a backflow prevention valve (check valve) 32.

The injection device 12 includes a base 40 disposed on the machine bed so as to be movable in the front-rear direction with respect to the machine bed, a linear guide 42 fixed to the base 40, and a pressure plate 44 movably supported by the linear guide 42 so as to be movable in the front-rear direction with respect to the base 40. The proximal end portion of the barrel 14 is fixed to the base 40 via a front plate 46. The pressure plate 44 rotatably supports the proximal end portion of the plunger 20. A rotary pulley 48 is provided on the proximal end side of the plunger 20. As the rotary pulley 48 rotates, the plunger 20 accordingly rotates about the axial direction (around the front-rear direction) of the plunger 20 (barrel 14).

Further, a ball screw 50 is screwed into the pressure plate 44. A rear plate 52 is fixed to the base 40, and rotatably supports the ball screw 50 on the proximal end side of the ball screw 50. As the ball screw 50 rotates, the pressure plate 44 is guided by the linear guide 42 to move in the front-rear direction. That is, by the ball screw 50 and the pressure plate 44, the rotational motion of the ball screw 50 is converted into a linear motion, and the linear motion is transmitted to the pressure plate 44. As the pressure plate 44 moves in the front-back direction, the plunger 20 moves in the front-rear direction with respect to the barrel 14. The pressure plate 44 is provided with a pressure detector 54 such as a load cell.

In addition to the molding material charging device 30, the injection molding machine 10 further includes a servomotor 60 for rotating the plunger 20, a servomotor 62 for moving the plunger 20 in the front-rear direction, and a controller 64 for controlling the servomotors 60, 62. The rotational driving force of the servomotor 60 is transmitted to the rotary pulley 48 via an unillustrated transmission mechanism (endless belt, pulley, etc.). As a result, the rotary pulley 48 rotates, and the plunger 20 also rotates accordingly. Further, the rotational driving force of the servomotor 62 is transmitted to the ball screw 50 via an unillustrated transmission mechanism (endless belt, pulley, etc.). As a result, the ball screw 50 rotates, and accordingly the pressure plate 44 and the plunger 20 move in the front-rear direction.

At the metering step in the molding cycle, the controller 64 controls the servomotor 62 to perform a retracting movement of the plunger 20 to meter the molding material. At this time, the molding material charging device 30 feeds the molding material from the feed hole 22 under the control of the controller 64 or another unillustrated controller. In the case of controlling the molding material charging device 30 by another controller, the other controller communicates with the controller 64.

During metering, the molding material fed from the feed hole 22 flows (is injected) into a space (metering chamber) 70 defined by the bore 16a of the nozzle adapter 16 and the plunger 20 and which is located in front of the plunger 20. The controller 64 retracts the plunger 20 while performing feedback control (back pressure control) on the servomotor 62 based on the pressure detected by the pressure detector 54 so as to apply a designated back pressure to the molding material fed (poured) into the space 70. Since the pressure plate 44 supporting the plunger 20 is guided by the linear guide 42 and moves in the front-rear direction, the frictional force during movement of the pressure plate 44 is reduced. As a result, precise back-pressure control can be done. For example, since the controller 64 can control back pressure from 0 to 1 MPa, it is possible to perform back-pressure control with higher precision even under low pressure conditions.

It should be noted that the controller 64 may rotate the plunger 20 by controlling the servomotor 60 at least when the plunger 20 moves backward. Thereby, it is possible to prevent the plunger 20 from being locally worn, and it is possible to improve the life-time of the plunger 20. More specifically, partial contact or abutment may occur between the plunger 20 and the barrel 14 and between the plunger and the nozzle adapter 16 due to various factors such as the weight, manufacturing error and/or mounting error of the plunger 20. When the plunger 20 being subjected to such partial contact is moved forward and backward relative to the barrel 14 and the nozzle adapter 16 without rotating the plunger 20, friction occurs only at the partial contact position (the same position) of the plunger 20, so that the life-time of the plunger 20 is shortened. To deal with this, the plunger 20 is rotated so as to vary the contact position of the plunger 20, whereby it is possible to improve the life-time of the plunger 20.

Figure 3:
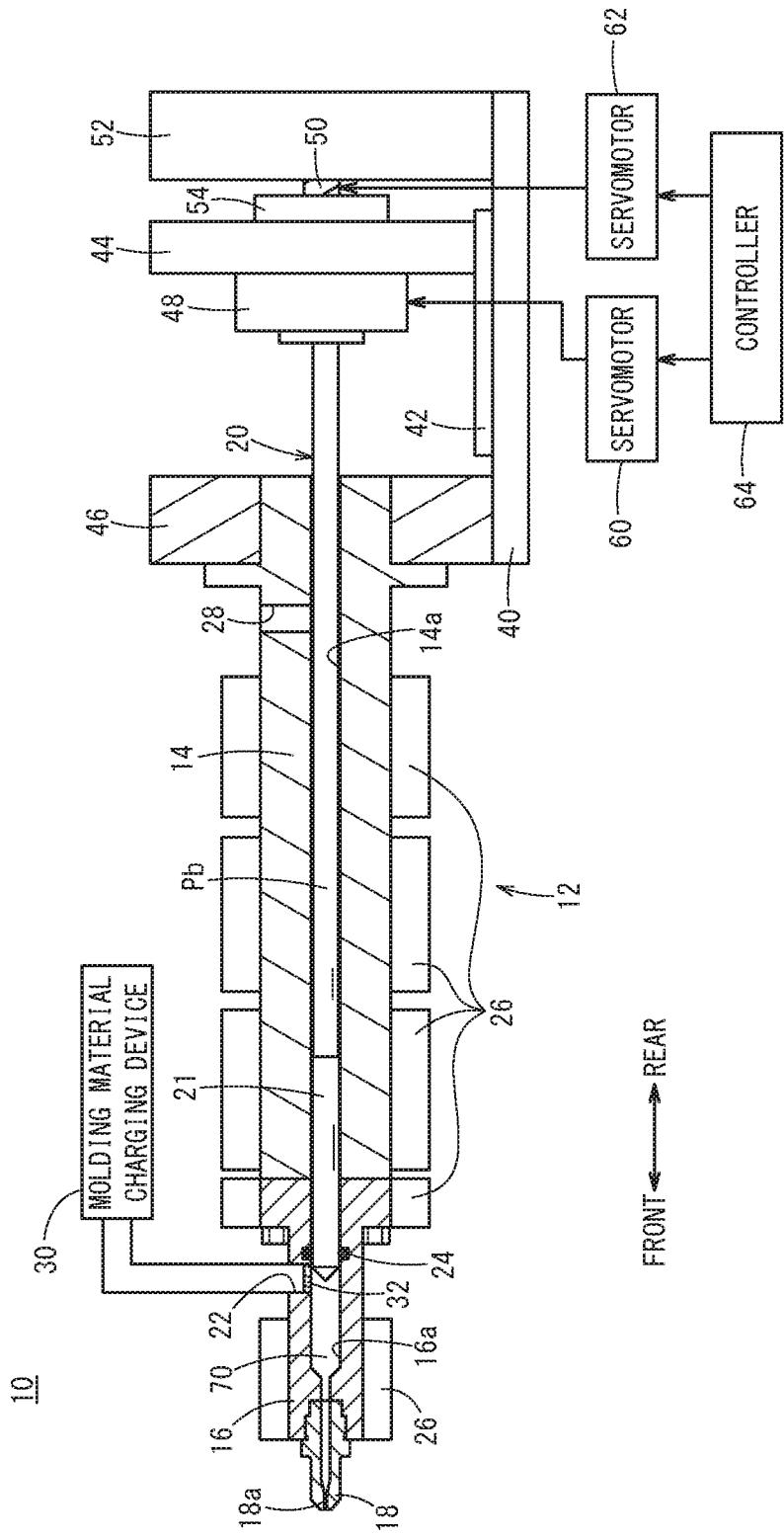
FIG. 3 is a diagram showing the injection device at a time when retraction movement of a plunger is completed from the state shown in FIG. 2.

FIG. 3 is a view showing the injection device 12 when retraction movement of the plunger 20 is completed from the state shown in FIG. 2. Before the retracting movement of the plunger 20 for metering is completed, the side surface 21a of the distal end portion 21 of the plunger 20 covers at least part of the feed hole 22, and is in contact with the packing 24 (see FIGS. 1 and 2). Even at the time of completion of the retracting movement for metering, at least part of the feed hole 22 is covered with the side surface 21a of the distal end portion 21 of the plunger 20 while the packing 24 is in contact with the side surface 21a of the distal end portion 21 (see FIG. 3).

That is, since the feed hole 22 is at least partly covered by the side surface 21a of the distal end portion 21 during the retracting movement (during metering), the tip of the distal end portion 21 will not be positioned rearward of the feed hole 22 at the time of completion of the retracting movement (completion of metering). Further, during the retracting movement, since the packing 24 is in contact with the side surface 21a of the distal end portion 21, the rear end of the distal end portion 21 will not be positioned forward of the packing 24 at the time of starting the retracting movement (at the start of metering).

At least one of the length of the distal end portion 21 of the plunger 20 in the front-rear direction and the locations of the feed hole 22 and the packing 24 in the front-rear direction is set so as to satisfy the above conditions. Further, the position of the feed hole 22 may be determined such that the entire feed hole 22 is covered with the side surface 21a of the distal end portion 21 of the plunger 20 when the retraction operation is completed. It is also possible to determine a maximum amount of retracting movement of the plunger 20 such that the side surface 21a of the distal end portion 21 of the plunger 20 still covers at least part of the feed hole 22 even when the plunger 20 is moved backward by the maximum amount.

In the above way, while the molding material charging device 30 is feeding the liquid molding material into the feed hole 22, the plunger 20 is moved backward with at least part of the feed hole 22 kept covered by the side surface 21a of the distal end portion 21 of the plunger 20, to thereby meter the molding material. Since the molding material charging device 30 feeds the molding material into the feed hole 22 at a predetermined pressure, the molding material fed into the feed hole 22 flows forward (ahead of the feed hole 22) through the clearance between the wall of the bore 16a of the nozzle adapter 16 and the side surface 21a of the distal end portion 21 of the plunger 20. Then, the molding material flows (is fed) into the space 70 located in front of the plunger 20 and is metered. During backward movement of the plunger 20, back-pressure control is performed so as to apply a designated back pressure to the molding material fed in the space 70.

The molding material fed from the feed hole 22 also flows rearward (behind the feed hole 22) through the gap between the bore 16a of the nozzle adapter 16 and the side surface 21a of the distal end portion 21 of the plunger 20, but the molding material does not flow to the rear of the packing 24 since the packing 24 is provided behind the feed hole 22. Therefore, it is possible to reduce the amount of molding material that stays in the gap between the bore 16a of the nozzle adapter 16 and the side surface 21a of the distal end portion 21 of the plunger 20 (stays around the axis of the plunger 20).

That is, since the molding material is fed from the side surface 21a of the distal end portion 21 of the plunger 20, it is possible to reduce the amount of molding material stagnating in the gap between the bore 16a of the nozzle adapter 16 and the side surface 21a of the distal end portion 21 of the plunger 20. As a result, occurrence of molding failures is suppressed. It is also possible to reduce the frictional force between the plunger 20 and the bore 16a of the nozzle adapter 16, and hence improve the life-time of the plunger 20.

If a configuration is provided in which the feed hole 22 is partly covered with the side surface 21a of the distal end portion 21 of the plunger 20 at the time of completion of the retracting movement, it is possible to further reduce the amount of the molding material staying in the gap between the wall of the bore 16a of the nozzle adapter 16 and the side surface 21a of the distal end portion 21 of the plunger 20. Accordingly, it is possible to further lessen the frictional force between the plunger 20 and the bore 16a of the nozzle adapter 16, and hence further improve the life-time of the plunger 20.

In addition, since the check valve 32 is provided, backflow of the molding material fed from the feed hole 22 is prevented so that the molding material can be satisfactorily fed into the space 70 located in front of the plunger 20.

When the metering step is completed, the controller 64 moves the entire injection device 12 forward so as to bring the nozzle 18 in contact with the mold, thereafter performs injection control, and then performs pressure holding control. That is, the controller 64 performs injection control of injecting the metered molding material (the molding material in the space 70) into the mold by moving the plunger 20 forward. Further, the controller 64 applies a force to the plunger 20 in the forward direction so as to apply a certain pressure to the molding material injected in the mold. This injection control and holding pressure control are performed by controlling the servomotor 62.

Since the outer diameter of the distal end portion 21 of the plunger 20 is made greater than the outer diameter of the proximal end portion Pb, which is a portion of the plunger other than the distal end portion 21, the gap between the side surface 21a of the distal end portion 21 and the bore 16a of the nozzle adapter 16 can be suppressed to a predetermined value or less. This makes it possible to suppress backflow of the molding material residing in front of the plunger 20 through the gap between the distal end portion 21 and the bore 16a of the nozzle adapter 16 during injection control and holding pressure control. As a result, the check valve 32 can be made simple, thereby saving costs. In addition, it is possible to suppress backflow, and hence apply pressure to the molding material in front of the plunger 20, efficiently.

[Modifications]

The above embodiment can also be modified as follows.

(Modification 1)

Figure 4:
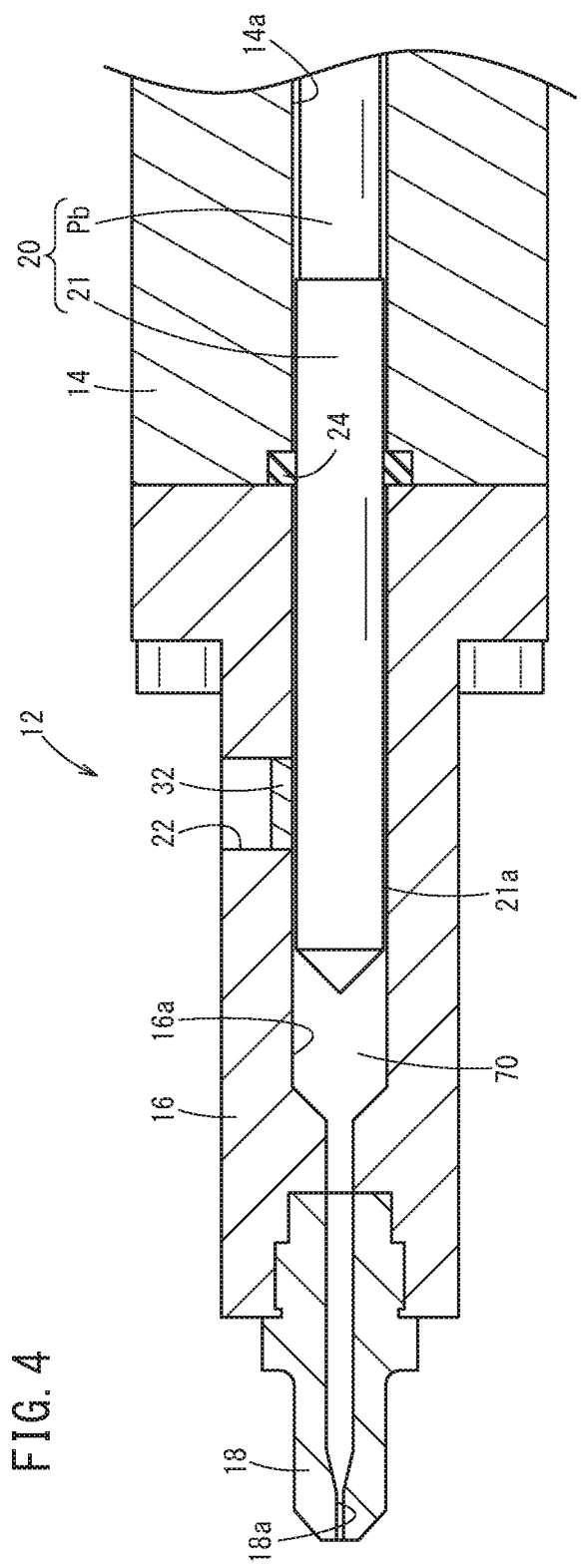
FIG. 4 is an enlarged view of main parts of an injection device according to Modification 1.

FIG. 4 is an enlarged view of main parts of an injection device 12 according to Modification 1. The same components as those in the above embodiment are denoted by the same reference numerals and only the different parts will be described.

In Modification 1, the packing 24 is not arranged in the bore 16a of the nozzle adapter 16 but is attached to the bore 14a of the barrel 14. In Modification 1, the packing 24 is arranged at the distal end of the bore 14a of the barrel 14.

Similarly to the above embodiment, the controller 64 feedback-controls the servomotor 62 while applying a designated back pressure to the molding material fed into the space 70 from the feed hole 22 to move the plunger 20 backward and thereby meter the molding material. The controller 64 performs the retracting movement of the plunger 20 such that the side surface 21a of the distal end portion 21 of the plunger 20 covers at least part of the feed hole 22 while remaining in contact with the packing 24. Incidentally, the controller 64 may turn the plunger 20 by controlling the servomotor 60 at least at the time when the plunger 20 moves backward.

Since at least part of the feed hole 22 is covered by the side surface 21a of the distal end portion 21 during the retracting movement (during metering), the tip of the distal end portion 21 will not be positioned behind the feed hole 22 at the time of completion of the retracting movement (at the completion of metering). Further, during the retracting movement, since the packing 24 is in contact with the side surface 21a of the distal end portion 21, the rear end of the distal end portion 21 will not be positioned ahead of the packing 24 at the time of starting the retracting movement (at the start of measurement).

At least one of the length of the distal end portion 21 of the plunger 20 in the front-rear direction and the locations of the feed hole 22 and the packing 24 with respect to the front-rear direction is set so as to satisfy the above conditions.

Thus, while the molding material charging device 30 is feeding the liquid molding material into the feed hole 22, the plunger 20 is moved backward with at least part of the feed hole 22 kept covered by the side surface 21a of the distal end portion 21 of the plunger 20, to thereby meter the molding material. Since the molding material charging device 30 feeds the molding material into the feed hole 22 at a predetermined pressure, the molding material fed into the feed hole 22 flows forward (ahead of the feed hole 22) through the clearance between the wall of the bore 16a of the nozzle adapter 16 and the side surface 21a of the distal end portion 21 of the plunger 20. Then, the molding material flows (is injected) into the space 70 located in front of the plunger 20 and is metered. During backward movement of the plunger 20, back-pressure control is performed so as to apply a designated back pressure to the molding material fed in the space 70.

The molding material fed from the feed hole 22 also flows rearward (behind the feed hole 22) through the gap between the bore 16a of the nozzle adapter 16 and the side surface 21a of the distal end portion 21 of the plunger 20, but the molding material does not flow to the rear of the packing 24 since the packing 24 is provided behind the feed hole 22. In Modification 1, since the packing 24 is provided at the distal end of the bore 14a of the barrel 14, it is possible to prevent the molding material from flowing toward the barrel 14. Therefore, it is possible to prevent the molding material from stagnating in the gap between the wall of the bore 14a of the barrel 14 and the side surface 21a of the distal end portion 21 of the plunger 20.

As described above, since the molding material is fed from the side surface 21a of the distal end portion 21 of the plunger 20, it is possible to reduce the amount of molding material stagnating in the gap between the bore 16a of the nozzle adapter 16 and the side surface 21a of the distal end portion 21 of the plunger 20 (stagnating around the axis of the plunger 20). As a result, occurrence of molding failures is suppressed. It is also possible to reduce the frictional force between the plunger 20 and the bore 16a of the nozzle adapter 16, and hence improve the life-time of the plunger 20.

Incidentally, it is not necessary to arrange the packing 24 at the distal end of the bore 14a as long as it is provided in the bore 14a of the barrel 14. In this case, it is preferable that the feed hole 22 and the packing 24 are arranged at positions close to each other in the front-rear direction.

(Modification 2)

Figure 5:
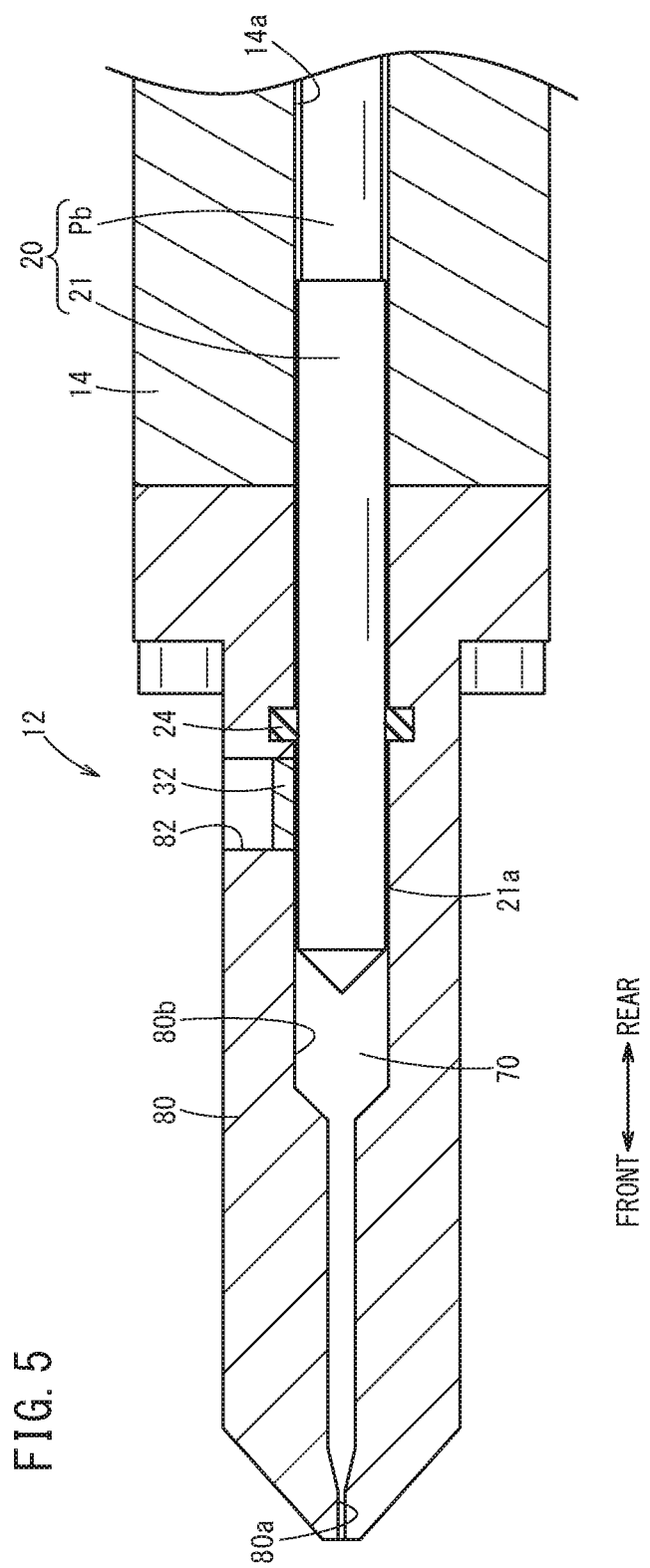
FIG. 5 is an enlarged view of main parts of an injection device according to Modification 2.

FIG. 5 is an enlarged view of main parts of an injection device 12 according to Modification 2. The same components as those in the above embodiment are denoted by the same reference numerals, and only the different parts will be described.

In Modification 2, a nozzle 80 is directly attached to the distal end of the barrel 14. The nozzle 80 is formed with a nozzle hole 80a for injecting the molding material into the mold and a bore 80b communicating with the nozzle hole 80a and enabling movement of the plunger 20 in the front-rear direction. The bore 80b communicates with the bore 14a of the barrel 14. The diameter of the bore 80b is preferably the same as that of the bore 14a.

The nozzle 80 is formed with a feed hole 82 for feeding a liquid molding material from the molding material charging device 30 into the bore 80b of the nozzle 80. The feed hole 82 is used to feed the molding material into the front of the plunger 20. In order to prevent the molding material fed into the bore 80b through the feed hole 82 from flowing backward and leaking out (back to the molding material charging device 30) through the feed hole 82, a check valve (backflow prevention valve) 32 is preferably provided on the nozzle 80 (feed hole 82).

In the bore 80b of the nozzle 80, a packing 24 is attached on the backward side with respect to the feed hole 82. It is preferable that the feed hole 82 and the packing 24 are provided at positions close to each other in the front-rear direction.

Similarly to the above-described embodiment, the controller 64 feedback-controls the servomotor 62 while applying a designated back pressure to the molding material fed into the space 70 from the feed hole 82 to move the plunger 20 backward and thereby meter the molding material. The controller 64 performs the retracting movement of the plunger 20 such that the side surface 21a of the distal end portion 21 of the plunger 20 covers at least part of the feed hole 82 while remaining in contact with the packing 24. Incidentally, the controller 64 may turn the plunger 20 by controlling the servomotor 60 at least at the time when the plunger 20 moves backward.

Since at least part of the feed hole 82 is covered by the side surface 21a of the distal end portion 21 during the retracting movement (during metering), the tip of the distal end portion 21 will not be positioned behind the feed hole 82 at the time of completion of the retracting movement (at the completion of metering). Further, during the retracting movement, since the packing 24 is in contact with the side surface 21a of the distal end portion 21, the rear end of the distal end portion 21 will not be positioned ahead of the packing 24 at the time of starting the retracting movement (at the start of measurement).

At least one of the length of the distal end portion 21 of the plunger 20 in the front-rear direction and the locations of the feed hole 82 and the packing 24 with respect to the front-rear direction is set so as to satisfy the above conditions.

Thus, while the molding material charging device 30 is feeding the liquid molding material into the feed hole 82, the plunger 20 is moved backward with at least part of the feed hole 82 kept covered by the side surface 21a of the distal end portion 21 of the plunger 20, to thereby meter the molding material. Since the molding material charging device 30 feeds the molding material into the feed hole 82 at a predetermined pressure, the molding material fed into the feed hole 82 flows forward (ahead of the feed hole 82) through the clearance between the wall of the bore 80b of the nozzle 80 and the side surface 21a of the distal end portion 21 of the plunger 20. Then, the molding material flows (is fed) into the space 70 located in front of the plunger 20 and is metered. During backward movement of the plunger 20, back-pressure control is performed so as to apply a designated back pressure to the molding material fed in the space 70.

The molding material fed from the feed hole 82 also flows rearward (behind the feed hole 82) through the gap between the bore 80b of the nozzle 80 and the side surface 21a of the distal end portion 21 of the plunger 20, but the molding material does not flow to the rear of the packing 24 since the packing 24 is provided behind the feed hole 82.

As described above, since the molding material is fed from the side surface 21a of the distal end portion 21 of the plunger 20, it is possible to reduce the amount of molding material stagnating in the gap between the bore 80b of the nozzle 80 and the side surface 21a of the distal end portion 21 of the plunger 20 (staying around the axis of the plunger 20). As a result, occurrence of molding failures is suppressed. It is also possible to reduce the frictional force between the plunger 20 and the bore 80b of the nozzle 80, and hence improve the life-time of the plunger 20.

As described in Modification 1, the packing 24 may be attached to the bore 14a of the barrel 14. Even in this case, the side surface 21a of the distal end portion 21 of the plunger 20 remains in contact with the packing 24 during the retracting movement of the plunger 20 for metering (from the start of the retraction operation to the end of the retraction operation).

(Modification 3)

Figure 6:
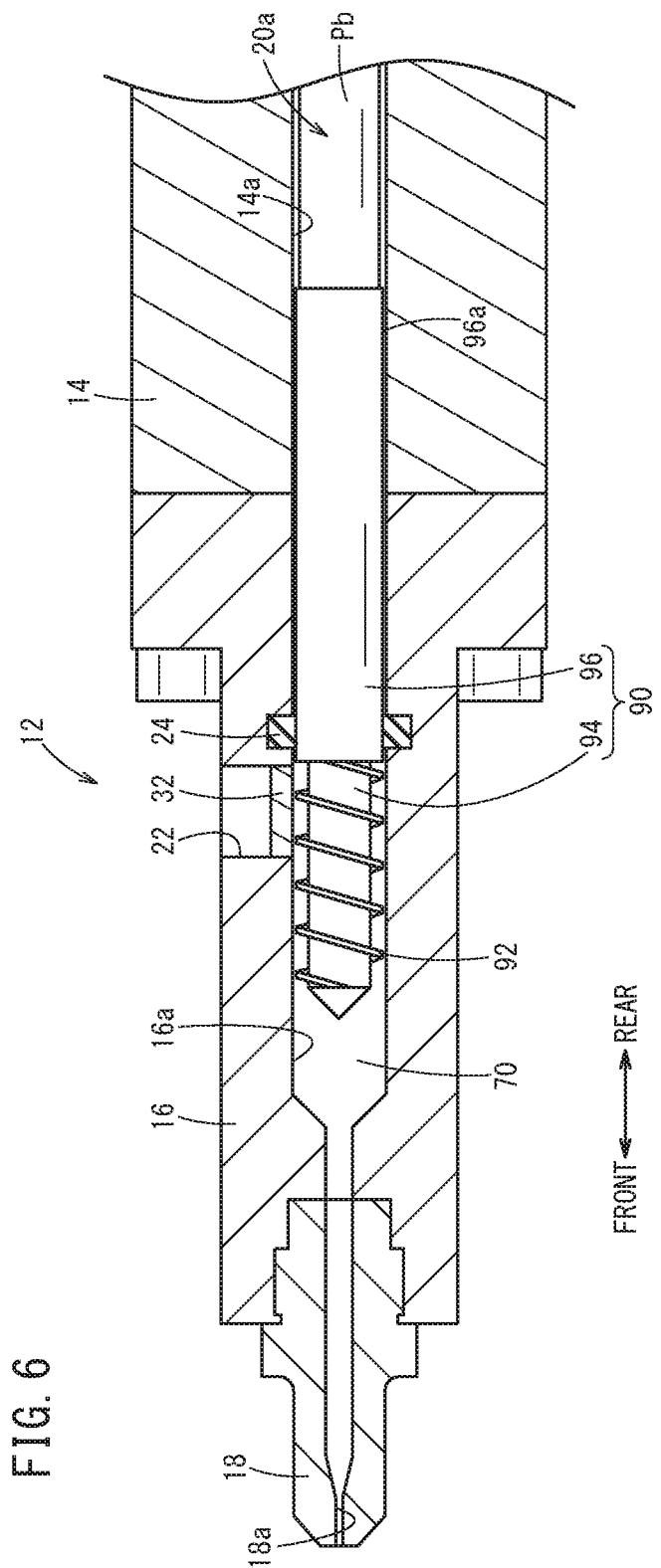
FIG. 6 is an enlarged view of main parts of an injection device according to Modification 3.

FIG. 6 is an enlarged view of main parts of an injection device 12 according to Modification 3. The same components as those in the above embodiment are denoted by the same reference numerals, and only the different parts will be described.

In Modification 3, a distal end portion 90 of a plunger 20a has a first member 94 having a helical flight 92 on its outer peripheral surface, and a second member 96. The second member 96 is joined to the rear side of the first member 94. The flight 92 has a function of feeding the molding material forward while kneading the molding material. Since the flight 92 is formed on the outer peripheral surface of the first member 94 of the distal end portion 90, the outer diameter of the first member 94 of the distal end portion 90 is smaller than the outer diameter of the distal end portion 21 described in the above embodiment, by at least the height of the flight 92. The outer diameter of the second member 96 is the same as that of the distal end portion 21 described in the above embodiment.

As in the above-described embodiment, the controller 64 feedback-controls the servomotor 62 while applying a designated back pressure to the molding material fed into the space 70 from the feed hole 22 to move the plunger 20a backward and thereby meter the molding material. The controller 64 performs the retracting movement of the plunger 20a such that at least part of the feed hole 22 is covered by the distal end portion 90 (the first member 94 with the flight 92, or the second member 96) while a side surface 96a of the second member 96 remains in contact with the packing 24.

The controller 64 rotates the plunger 20a by controlling the servomotor 60 while the plunger 20a is moved backward. The plunger 20a is rotated in such a direction that the flight 92 can convey the molding material fed from the feed hole 22 forward. As a result, the molding material can be satisfactorily fed into the space 70 by the flight 92.

Since at least part of the feed hole 22 is covered by the distal end portion 90 (the first member 94 or the second member 96) during the retracting movement (during metering), the tip of the first member 94 of the distal end portion 90 will not be positioned behind the feed hole 22 at the time of completion of the retracting movement (at the completion of metering). Further, during the retracting movement, since the packing 24 is in contact with the side surface 96a of the second member 96 of the distal end portion 90, the rear end of the second member 96 of the distal end portion 90 will not be positioned ahead of the packing 24 at the time of starting the retracting movement (at the start of metering), whereas the tip of the second member 96 of the distal end portion 90 will not be positioned in the rear of the packing 24 when the retracting movement is completed.

At least one of the length of the distal end portion 90 (the first member 94 and the second member 96) of the plunger 20a in the front-rear direction and the locations of the feed hole 22 and the packing 24 with respect to the front-rear direction is set so as to satisfy the above conditions.

Thus, while the molding material charging device 30 is feeding the liquid molding material into the feed hole 22, the plunger 20a is rotated and moved backward with at least part of the feed hole 22 kept covered by the distal end portion 90 of the plunger 20a, to thereby meter the molding material. Accordingly, it is possible to advance the molding material fed through the feed hole 22 while kneading by the flight 92 and prevent the molding material fed into the feed hole 22 from flowing backward. Then, the molding material flows (is injected) into the space 70 located in front of the plunger 20a and is metered. During backward movement of the plunger 20a, back-pressure control is performed so as to apply a designated back pressure to the molding material fed in the space 70.

Even if the molding material fed from the feed hole 22 flows rearward through the gap between the inner wall of the bore 16a of the nozzle adaptor 16 and the outer wall of the distal end portion 90, the packing 24 in the rear of the feed hole 22 blocks backflow of the molding material to rearward of the packing 24.

As described above, since the molding material is fed from the side surface of the distal end portion 90 of the plunger 20a and the molding material is conveyed forward as being kneaded by the flight 92, it is possible to reduce the amount of molding material stagnating in the gap between the bore 16a of the nozzle adaptor 16 and the distal end portion 90 of the plunger 20a (staying around the axis of the plunger 20a). As a result, it is possible to reduce the frictional force between the plunger 20a and the bore 16a of the nozzle adaptor 16, and hence improve the life-time of the plunger 20a. Further, occurrence of molding failures is reduced.

Incidentally, the first member 94 having the flight 92 may be arranged so as to cover at least part of the feed hole 22 during the retracting movement (during metering). Coverage of at least part of the feed hole 22 with the first member 94 makes it possible to efficiently send the molding material fed from the feed hole 22 forward. Thus, it is possible to further reduce the amount of molding material staying in the gap between the bore 16a of the nozzle adapter 16 and the distal end portion 90 of the plunger 20a.

(Modification 4)

Figure 7:
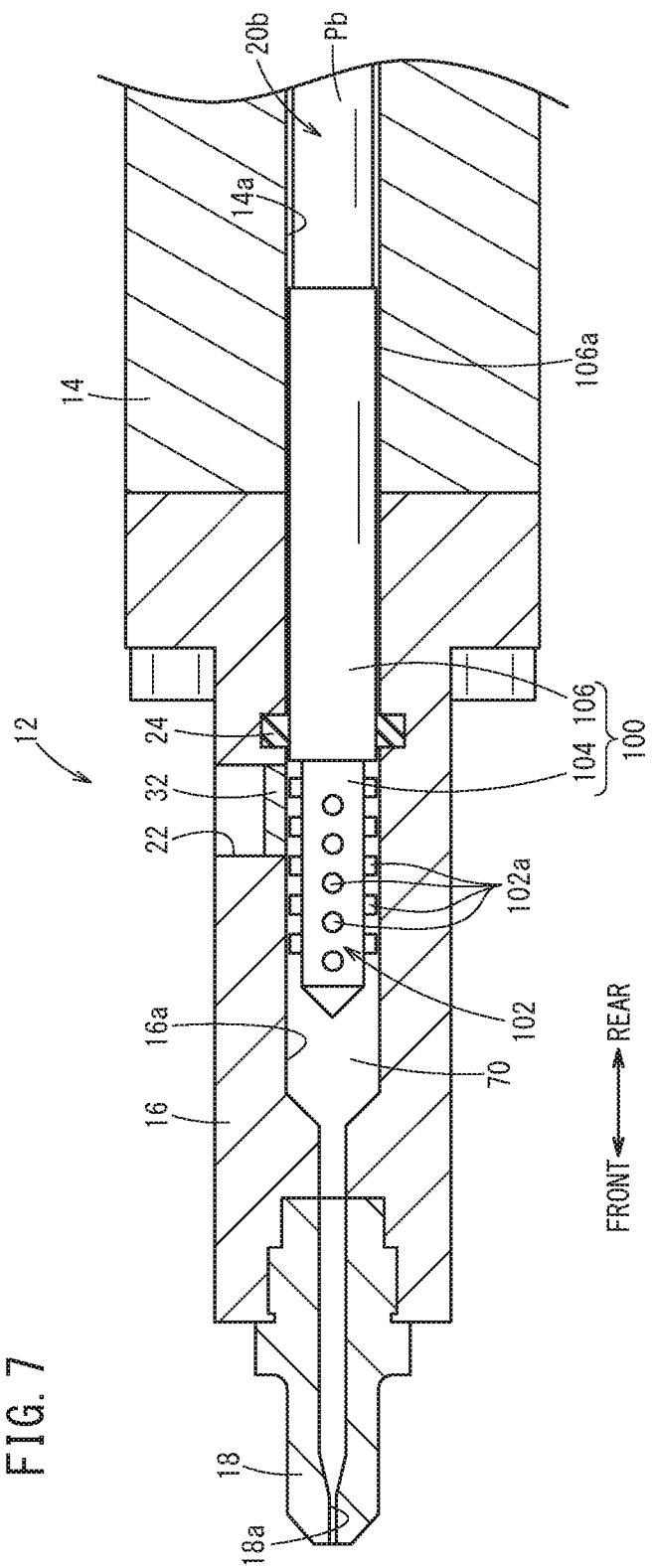
FIG. 7 is an enlarged view of main parts of an injection device according to Modification 4.

FIG. 7 is an enlarged view of main parts of an injection device 12 according to Modification 4. The same components as those in the above embodiment are denoted by the same reference numerals, and only the different parts will be described.

In Modification 4, a distal end portion 100 of a plunger 20b includes a first member 104 having a mixing portion 102 formed on its outer peripheral surface, and a second member 106. The second member 106 is joined to the rear side of the first member 104. The mixing portion 102 has a function of applying shearing force to the molding material and kneading the molding material, and includes a plurality of protrusions 102a protruding upright from the outer peripheral surface of the first member 104. Since the mixing portion 102 is provided on the outer peripheral surface of the first member 104 of the distal end portion 100, the outer diameter of the first member 104 of the distal end portion 100 is smaller than that of the distal end portion 21 described in the above embodiment by at least the height of the mixing portion 102. The outer diameter of the second member 106 is the same as that of the distal end portion 21 described in the above embodiment.

Similarly to the above embodiment, the controller 64 feedback-controls the servomotor 62 while applying a designated back pressure to the molding material fed into the space 70 from the feed hole 22, to move the plunger 20b backward and thereby meter the molding material. The controller 64 performs the retracting movement of the plunger 20b such that at least part of the feed hole 22 is covered by the distal end portion 100 (the first member 104 with the mixing portion 102, or the second member 106) while a side surface 106a of the second member 106 remains in contact with the packing 24.

The controller 64 rotates the plunger 20b by controlling the servomotor 60 while the plunger 20b is moved backward. This enables the mixing portion 102 to favorably shear and knead the molding material fed from the feed hole 22.

Since at least part of the feed hole 22 is covered by the distal end portion 100 (the first member 104 or the second member 106) during the retracting movement (during metering), the tip of the first member 104 of the distal end portion 100 will not be positioned behind the feed hole 22 at the time of completion of the retracting movement (at the completion of metering). Further, during the retracting movement, since the packing 24 is in contact with the side surface 106a of the second member 106 of the distal end portion 100, the rear end of the second member 106 of the distal end portion 100 will not be positioned ahead of the packing 24 at the time of starting the retracting movement (at the start of metering), whereas the tip of the second member 106 of the distal end portion 100 will not be positioned in the rear of the packing 24 when the retracting movement is completed.

At least one of the length of the distal end portion 100 (the first member 104 and the second member 106) of the plunger 20b in the front-rear direction and the locations of the feed hole 22 and the packing 24 with respect to the front-rear direction is set so as to satisfy the above conditions.

Thus, while the molding material charging device 30 is feeding the liquid molding material into the feed hole 22, the plunger 20b is rotated and moved backward with at least part of the feed hole 22 kept covered by the distal end portion 100 of the plunger 20b, to thereby meter the molding material. Since the molding material charging device 30 feeds the molding material into the feed hole 22 at a predetermined pressure, the molding material fed into the feed hole 22 flows forward (ahead of the feed hole 22) through the clearance between the bore 16a of the nozzle adapter 16 and the distal end portion 100 of the plunger 20b. In this process, the molding material is sheared and kneaded by the mixing portion 102. Then, the molding material flows (is injected) into the space 70 located in front of the plunger 20b and is metered. During backward movement of the plunger 20b, back-pressure control is performed so as to apply a designated back pressure to the molding material fed into the space 70.

The molding material fed from the feed hole 22 also flows rearward (behind the feed hole 22) through the gap between the bore 16a of the nozzle adapter 16 and the distal end portion 100. However, since the packing 24 is provided behind the feed hole, and thereby prevents the molding material from flowing rearward of the packing 24.

As described above, since the molding material is fed from the side surface of the distal end portion 100 of the plunger 20b, it is possible to reduce the amount of molding material stagnating in the gap between the bore 16a of the nozzle adapter 16 and the distal end portion 100 (stagnating around the axis of the plunger 20b). As a result, it is possible to reduce the frictional force between the plunger 20b and the bore 16a of the nozzle adapter 16, and hence improve the life-time of the plunger 20b. Further, occurrence of molding failures can be suppressed.

(Modification 5)

In the above-described embodiment, the outer diameter of the proximal end portion Pb other than the distal end portion 21 of the plunger 20 is made smaller than that of the distal end portion 21, but the plunger 20 may be made constant in outer diameter. That is, the outer diameter of the proximal end portion Pb may be equal to the outer diameter of the distal end portion 21. In this case, during backward movement for metering, it is only necessary for at least part of the feed hole 22 to be covered with the side surface of the plunger 20 while the packing 24 only needs to be in contact with the side surface of the plunger 20.

(Modification 6)

Two or more of the above Modifications 1 to 5 may be freely combined as long as no technical inconsistency occurs. For example, any one or more of Modifications 3 to 5 may be combined with Modification 1 or Modification 2. Alternatively, Modification 3 and Modification 4 may be combined. When Modification 3 is combined with Modification 4, the mixing portion 102 should be arranged on the front side of the flight 92. As a result, the molding material fed from the feed hole 22 (or 82) is first kneaded and conveyed forward by the flight 92, and then sheared and kneaded by the mixing portion 102.

As has been described heretofore, each of the injection molding machines 10 described in the above embodiment and Modifications 1 to 6 performs molding by injecting a molding material into a mold from a nozzle 18 (or 80) arranged on the distal end side of a barrel 14. The injection molding machine 10 includes: a plunger 20 (or 20a, 20b) provided inside the barrel 14 and configured to move forward and backward in an axial direction thereof and rotate about the axis thereof; a feed hole 22 (or 82) allowing the molding material in liquid form to be fed into the front of the plunger 20 (or 20a, 20b); a packing 24 provided on the rear side of the feed hole 22 (or 82) to prevent the molding material fed through the feed hole 22 (or 82) from flowing backward along the plunger 20 (or 20a, 20b); and a controller 64 for controlling retracting movement of the plunger 20 (or 20a, 20b) based on the pressure of the molding material fed from the feed hole 22 (or 82) to perform metering. Further, at least part of the feed hole 22 (or 82) is covered by the side surface of the plunger 20 (or 20a, 20b) at least from the start to the end of the retracting movement.

With this configuration, since the molding material is fed from the side surface of the plunger 20 (or 20a, 20b), it is possible to reduce the amount of molding material stagnating around the side surface of plunger 20 (or 20a, 20b). As a result, occurrence of molding failures can be suppressed. It is also possible to reduce the frictional force acting on the plunger 20 (or 20a, 20b), and hence improve the life-time of the plunger 20 (or 20a, 20b).

The nozzle 80 may be attached directly to the barrel 14. In this case, the nozzle 80 and the barrel 14 have respective bores 80b and 14a formed thereinside that enable the plunger 20 (or 20a, 20b) to move forward and backward. Further, the feed hole 82 is formed in the nozzle 80 so as to allow the molding material to be fed into the bore 80b formed inside the nozzle 80, and the packing 24 is attached to the bore 80b, 14a formed inside the nozzle 80 or the barrel 14. Also in this case, it is possible to reduce the amount of molding material stagnating around the side surface of plunger 20 (or 20a, 20b), reduce the frictional force acting on the plunger 20 (or 20a, 20b). Accordingly, it is possible to improve the life-time of the plunger 20 (or 20a, 20b). Also, occurrence of molding failures can be suppressed.

In the case that the packing 24 is attached to the nozzle 80, the distance between the feed hole 82 and the packing 24 becomes shorter. Thus, the molding material staying around the side surface of the plunger 20 (or 20a, 20b) can be further reduced. As a result, it is possible to further suppress the frictional force acting on the plunger 20 (or 20a, 20b) and hence further improve the life-time of the plunger 20 (or 20a, 20b). Also, occurrence of molding failure can be further reduced.

The nozzle 18 may be attached to the barrel 14 via a nozzle adaptor 16. In this case, the nozzle adaptor 16 and the barrel 14 have respective bores 16a and 14a formed thereinside that enable the plunger 20 (or 20a, 20b) to move forward and backward. Further, the feed hole 22 is formed in the nozzle adaptor 16 so as to allow the molding material to be fed into the bore 16a formed inside the nozzle adaptor 16, and the packing 24 is attached to the bore 16a, 14a formed inside the nozzle adaptor 16 or the barrel 14. Also in this case, it is possible to reduce the amount of molding material stagnating around the side surface of plunger 20 (or 20a, 20b), and reduce the frictional force acting on the plunger 20 (or 20a, 20b). Accordingly, it is possible to improve the life-time of the plunger 20 (or 20a, 20b). Also, occurrence of molding failures can be suppressed.

In the case that the packing 24 is attached to the nozzle adaptor 16, the distance between the feed hole 22 and the packing 24 becomes shorter, so that the molding material staying around the side surface of the plunger 20 (or 20a, 20b) can be further reduced. As a result, it is possible to further suppress the frictional force acting on the plunger 20 (or 20a, 20b) and hence further improve the life-time of the plunger 20 (or 20a, 20b). Also, occurrence of molding failure can be further reduced.

At least part of a distal end portion 21 (or 90, 100) of the plunger 20 (or 20a, 20b) may have an outer diameter greater than that of a proximal end portion Pb, which is a portion other than the distal end portion 21 (or 90, 100). In this case, a gap between at least part of the distal end portion 21 (or 90, 100) and the bore 16a (or 14a, 80b) may be preferably set to be equal to or smaller than a predetermined size. Further, at least part of the feed hole 22 (or 82) is covered by the side surface of the distal end portion 21 (or 90, 100) of the plunger 20 (or 20a, 20b) at least from the start to the end of the retracting movement.

With this configuration, it is possible to inhibit the molding material from flowing backward or in the retracting direction of the plunger 20 (or 20a, 20b) when the plunger 20 (or 20a, 20b) injects the molding material into the cavity of the mold or holds the pressure. In addition, since the backward flow can be suppressed, it is possible to simplify the check valve 32 provided in the feed hole 22 (or 82), and thereby save costs. In addition, it is possible to suppress backflow of the molding material, and hence pressure can be efficiently applied on the molding material in front of the plunger 20 (or 20a, 20b). Furthermore, it is possible to suppress the friction acting on the plunger 20 (or 20a, 20b) when the plunger 20 (or 20a, 20b) moves forward and backward.

A flight 92 may be provided on the distal end side of the plunger 20 (or 20a, 20b). This enables the molding material fed from the side face of the plunger 20 (or 20a, 20b) to be injected into the space 70 in front of the plunger 20 (or 20a, 20b) in a favorable manner.

A mixing portion 102 for shearing or kneading the molding material may be provided on the distal end side of the plunger 20 (or 20a, 20b). With the structure, the molding material fed from the side surface of the plunger 20 (or 20a, 20b) can be sheared and kneaded.

A second hole 28 communicating with the bore 14a of the barrel 14 may be provided in a proximal end portion of the barrel 14. With this, even if gas is generated from the molding material or when air is entrapped in the molding material, it is possible to remove the air and gases through the second hole 28, whereby it is possible to prevent occurrence of molding defects such as silver streaks, bubble defects and the like. Even when the molding material flows backward and leak to the proximal end portion Pb side of the plunger 20 (or 20a, 20b), the molding material having leaked into the bore 14a on the proximal end portion Pb side can be removed easily through this second hole 28.

The controller 64 may be configured to rotate the plunger 20 (or 20a, 20b) during the retracting movement. With this configuration, it is possible to prevent the plunger 20 (or 20a, 20b) from being locally worn, and hence improve the life-time of the plunger 20 (or 20a, 20b).

The injection devices 12 described in the above embodiment and Modifications 1 to 6 can be used as a general in-line type injection device for plasticizing and kneading conventional solid molding materials. Therefore, a wide range of molding materials can be handled by one injection molding machine 10.

While the invention has been particularly shown and described with reference to preferred embodiments, it will be understood that variations and modifications can be effected thereto by those skilled in the art without departing from the scope of the invention as defined by the appended claims.

What is claimed is:

1. An injection molding machine that performs molding by injecting a molding material into a mold from a nozzle arranged on a distal end side of a barrel, comprising:
   a plunger provided inside the barrel and configured to move forward and backward in an axial direction thereof and rotate about an axis thereof;
   a feed hole configured to allow the molding material in liquid form to be fed into a front of the plunger;
   a backflow prevention member provided on a backward side of the feed hole and configured to prevent the molding material fed through the feed hole from flowing backward along the plunger; and
   a controller configured to control retracting movement of the plunger based on pressure of the molding material fed from the feed hole to thereby perform metering, wherein
   the nozzle is attached directly to the barrel;
   the nozzle and the barrel each have a bore formed thereinside that enables the plunger to move forward and backward;
   the feed hole is formed in the nozzle so as to allow the molding material to be fed into the bore formed inside the nozzle; and
   the backflow prevention member is attached to the bore formed inside the nozzle or the barrel, an outer diameter of a cylindrical portion that is a distal end portion of the plunger is greater than an outer diameter of a cylindrical portion that is a proximal end portion of the plunger, a gap between the cylindrical portion that is the distal end portion and the bore is set to be equal to or smaller than a predetermined size, at least part of the feed hole is covered by a side surface of the cylindrical portion that is the distal end portion of the plunger, at least from a start of the retracting movement to an end of the retracting movement.

2. An injection molding machine that performs molding by injecting a molding material into a mold from a nozzle arranged on a distal end side of a barrel, comprising:

a plunger provided inside the barrel and configured to move forward and backward in an axial direction thereof and rotate about an axis thereof;

a feed hole configured to allow the molding material in liquid form to be fed into a front of the plunger;

a backflow prevention member provided on a backward side of the feed hole and configured to prevent the molding material fed through the feed hole from flowing backward along the plunger; and a controller configured to control retracting movement of the plunger based on pressure of the molding material fed from the feed hole to thereby perform metering, wherein the nozzle is attached to the barrel via a nozzle adaptor;

the nozzle adaptor and the barrel each have a bore formed thereinside that enables the plunger to move forward and backward;

the feed hole is formed in the nozzle adaptor so as to allow the molding material to be fed into the bore formed inside the nozzle adaptor; and the backflow prevention member is attached to the bore formed inside the nozzle adaptor or inside the barrel, an outer diameter of a cylindrical portion that is a distal end portion of the plunger is greater than an outer diameter of a cylindrical portion that is a proximal end portion of the plunger, a gap between the cylindrical portion that is the distal end portion and the bore is set to be equal to or smaller than a predetermined size, at least part of the feed hole is covered by a side surface of the cylindrical portion that is the distal end portion of the plunger, at least from a start of the retracting movement to an end of the retracting movement.

3. The injection molding machine according to claim 1, wherein a second hole communicating with the bore of the barrel is formed in a proximal end portion of the barrel.

4. The injection molding machine according to claim 2, wherein a second hole communicating with the bore of the barrel is formed in a proximal end portion of the barrel.

5. The injection molding machine according to claim 1, wherein the controller is configured to rotate the plunger during the retracting movement.

6. The injection molding machine according to claim 2, wherein the controller is configured to rotate the plunger during the retracting movement.

* * * * *